United States Patent
Palo et al.

(10) Patent No.: US 10,638,425 B2
(45) Date of Patent: Apr. 28, 2020

(54) ADAPTIVE OUT OF SERVICE SCAN FOR MODEM POWER OPTIMIZATION IN A WIRELESS COMMUNICATION SYSTEM

(71) Applicant: QUALCOMM Incorporated, San Diego, CA (US)

(72) Inventors: Nigam Mohan Palo, Hyderabad (IN); Srikanth Perla, Tenali (IN); Gargi Golwalkar, Hyderabad (IN); Mahaveer Prasad Vaishnav, Hyderabad (IN); Sudheer Kumar Reddy Vangala, Hyderabad (IN); Siva Krishna Yeginati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/839,271

(22) Filed: Dec. 12, 2017

(65) Prior Publication Data

US 2019/0182775 A1    Jun. 13, 2019

(51) Int. Cl.
*H04W 52/02* (2009.01)
*H04W 52/50* (2009.01)
(Continued)

(52) U.S. Cl.
CPC ... *H04W 52/0235* (2013.01); *H04W 52/0216* (2013.01); *H04W 52/0229* (2013.01);
(Continued)

(58) Field of Classification Search
CPC ......... H04W 52/0235; H04W 52/0225; H04W 52/0209; H04W 52/02
(Continued)

(56) References Cited

U.S. PATENT DOCUMENTS 9,807,661 B1   10/2017   Manepalli et al.
2014/0194086 A1   7/2014   Alam et al.
(Continued)

FOREIGN PATENT DOCUMENTS

EP   2934046 A2   10/2015

OTHER PUBLICATIONS

International Search Report and Written Opinion—PCT/US2018/057495—ISA/EPO—dated Feb. 1, 2019.

*Primary Examiner* — Jeffrey M Rutkowski
*Assistant Examiner* — Sudesh M Patidar
(74) *Attorney, Agent, or Firm* — Qualcomm Incorporated

(57) ABSTRACT

A method for adaptive OOS scan for modem power optimization in a wireless communication system. The method includes establishing, by a source wireless device, a direct communication connection to a target wireless device and requesting wireless communication system information to be sent from the target wireless device and activating an adaptive OOS scan on the target wireless device if the source wireless device and target wireless device are connected to the same wireless communication system and using the same RAT. The method also includes instructing the adaptive OOS scan on the target wireless device to pause the standard OOS scan when both the source wireless device and target wireless device are OOS, and the adaptive OOS scan on the target wireless device to resume the standard OOS scan after the source wireless device has performed the standard OOS scan and finds an acceptable communication connection.

31 Claims, 5 Drawing Sheets

(51) Int. Cl.
*H04W 76/14* (2018.01)
*H04W 76/19* (2018.01)
*H04W 88/06* (2009.01)
*H04W 76/16* (2018.01)
*H04W 48/16* (2009.01)
*H04W 4/80* (2018.01)

(52) U.S. Cl.
CPC ... *H04W 52/0241* (2013.01); *H04W 52/0245* (2013.01); *H04W 52/0274* (2013.01); *H04W 52/50* (2013.01); *H04W 76/14* (2018.02); *H04W 76/19* (2018.02); *H04W 4/80* (2018.02); *H04W 48/16* (2013.01); *H04W 76/16* (2018.02); *H04W 88/06* (2013.01)

(58) Field of Classification Search
USPC .......................................................... 370/311
See application file for complete search history.

(56) References Cited

U.S. PATENT DOCUMENTS

| | | | |
|---|---|---|---|
| 2015/0323981 A1* | 11/2015 | Yarvis | G06F 1/3293 |
| | | | 713/323 |
| 2016/0262094 A1* | 9/2016 | Khay-Ibbat | H04W 72/048 |
| 2017/0055195 A1* | 2/2017 | Ingale | H04W 36/22 |
| 2017/0353990 A1 | 12/2017 | Nair et al. | |
| 2018/0132092 A1* | 5/2018 | Choi | H04W 8/00 |

\* cited by examiner

ADAPTIVE OUT OF SERVICE SCAN FOR MODEM POWER OPTIMIZATION IN A WIRELESS COMMUNICATION SYSTEM

TECHNICAL FIELD

The present disclosure relates generally to wireless communications, and more particularly, to adaptive out of service (OOS) scan for modem power optimization in a wireless communication system.

BACKGROUND

The use of wireless devices in our daily lives has become an almost required necessity. This necessity has created a proliferation of various technologies that allow us to interact with them via our wireless devices. This includes the emerging class of wireless devices known in the group of the Internet of Things. Some of these technologies are incorporated into our personal items such as smartwatches and/or into our cars, offices, and homes.

This emerging class of wireless devices incorporate the ability to directly connect to other wireless devices via personal area or short-range technologies such as Bluetooth, Bluetooth Low Energy, Near Field Communication (NFC), and Wi-Fi. The emerging wireless devices are now incorporating the ability to independently communicate in a wireless communication system such as a cellular network. This additional communication ability creates battery power issues in the emerging wireless devices. For example, when a smartphone is connected to a smartwatch via a Bluetooth connection and both devices are also connected to a cellular network. A battery power issue arises when both devices are out of service from the cellular network since both devices will perform a standard out of service (OOS) scan to try and find a way to reconnect back to the cellular network. The smartwatch has limited battery power so each time the standard OOS scan runs, the more the smartwatch battery gets drained. Accordingly, a need exists for an adaptive out of service scan for modem power optimization in a wireless communication system.

SUMMARY

In an aspect of the present disclosure, a method for adaptive out of service (OOS) scan for modem power optimization in a wireless communication system. The method includes establishing, by a source wireless device, a direct communication connection to a target wireless device. The method also includes requesting, by the source wireless device, wireless communication system information to be sent from the target wireless device to the source wireless device. The method also includes activating, by the source wireless device, an adaptive OOS scan on the target wireless device if the source wireless device and target wireless device are connected to the same wireless communication system and using the same radio access technology (RAT) based on the wireless communication system information. The method also includes instructing, by the source wireless device, the adaptive OOS scan on the target wireless device to pause the standard OOS scan when both the source wireless device and target wireless device are OOS. The method also includes instructing, by the source wireless device, the adaptive OOS scan on the target wireless device to resume the standard OOS scan after the source wireless device has performed the standard OOS scan and finds an acceptable communication connection in order to establish a communication connection to the wireless communication system using the radio access technology.

The direct communication connection between the source wireless device and target wireless device is a Bluetooth connection, Bluetooth Low Energy connection, Near field communication (NFC), or WiFi connection. The acceptable communication can be a communication connection that has a sufficient signal strength to allow the source wireless device to establish a communication connection to the wireless communication system using the radio access technology. The target wireless device will initiate the standard OOS if the source wireless device and target wireless device lose direct communication connection to each other. The source wireless device can send the target wireless device information on the acceptable communication connection.

In another aspect of the present disclosure, a source wireless device for adaptive out of service (OOS) scan for modem power optimization in a wireless communication system is described. The source wireless device includes a memory communicatively coupled with the processor and storing computer-readable code that, when executed by the processor, causes the source wireless device to perform the following steps including establishing a direct communication connection to a target wireless device and requesting wireless communication system information to be sent from the target wireless device to the source wireless device. The steps also include activating an adaptive OOS scan on the target wireless device if the source wireless device and target wireless device are connected to the same wireless communication system and using the same radio access technology (RAT) based on the wireless communication system information. The steps also includes instructing the adaptive OOS scan on the target wireless device to pause the standard OOS scan when both the source wireless device and target wireless device are OOS and instructing the adaptive OOS scan on the target wireless device to resume the standard OOS scan after the source wireless device has performed the standard OOS scan and finds an acceptable communication connection in order to establish a communication connection to the wireless communication system using the radio access technology.

In another aspect of the present disclosure, a source wireless device for adaptive out of service (OOS) scan for modem power optimization in a wireless communication system is described. The source wireless device includes means for establishing a direct communication connection to a target wireless device and means for requesting wireless communication system information to be sent from the target wireless device to the source wireless device. The source wireless device also includes means for activating an adaptive OOS scan on the target wireless device if the source wireless device and target wireless device are connected to the same wireless communication system and using the same radio access technology (RAT) based on the wireless communication system information and means for instructing the adaptive OOS scan on the target wireless device to pause the standard OOS scan when both the source wireless device and target wireless device are OOS. The source wireless device further includes means for instructing the adaptive OOS scan on the target wireless device to resume the standard OOS scan after the source wireless device has performed the standard OOS scan and finds an acceptable communication connection in order to establish a communication connection to the wireless communication system using the radio access technology.

In another aspect of the present disclosure, a non-transitory tangible computer readable medium is described. The computer readable medium includes storing computer executable code for causing establishing, by a source wireless device, a direct communication connection to a target wireless device and code for requesting, by the source wireless device, wireless communication system information to be sent from the target wireless device to the source wireless device. The non-transitory tangible computer readable medium also includes code for activating, by the source wireless device, an adaptive OOS scan on the target wireless device if the source wireless device and target wireless device are connected to the same wireless communication system and using the same radio access technology (RAT) based on the wireless communication system information. The non-transitory tangible computer readable medium also includes code for instructing, by the source wireless device, the adaptive OOS scan on the target wireless device to pause the standard OOS scan when both the source wireless device and target wireless device are OOS and code for instructing, by the source wireless device, the adaptive OOS scan on the target wireless device to resume the standard OOS scan after the source wireless device has performed the standard OOS scan and finds an acceptable communication connection in order to establish a communication connection to the wireless communication system using the radio access technology.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

With the rapid development of emerging wireless devices, there is a need for these wireless devices to effectively communicate with other existing wireless devices while also conserving battery power. Many of these wireless devices are able to communicate with cellular networks and directly with other wireless devices via short-range communications.

One example of this is the use of a smartwatch in conjunction with a smartphone. In this example, the smartphone is directly connected to the smartwatch via a Bluetooth communication link. The smartphone and smartwatch are also connected to a cellular network which causes each device to perform certain scans and other operations that can tend to drain battery power. One example of this problem is when the smartphone and smartwatch are directly connected via Bluetooth and they are taken outside the reach of the cellular network and go into an out of service (OOS) state. Once they go into an out of service (OOS) state, both devices will perform standard out of service scans to try and find a way to connect back to the cellular network. The problem is that the standard out of service scan can require significant processor power and may need to be run several times if the device goes in and out of communication coverage of the cellular network. This can cause significant power drainage of the smartwatch which generally has a much smaller battery reserve than other wireless devices such as the smartphone.

To overcome this problem, the smartphone can instruct the smartwatch to wait to perform the standard out of service scan until the smartphone performs the standard out of service scan and finds an acceptable communication link to the cellular network. This saves the battery power of the smartwatch because the smartphone will do the scanning until it finds an acceptable connection to the cellular network and then instruct the smartwatch to perform the standard out of service scan. Because the smartphone has found an acceptable communication link, the smartwatch will be able to perform the standard out of service scan more quickly and efficiently and conserve battery power.

Figure 1:
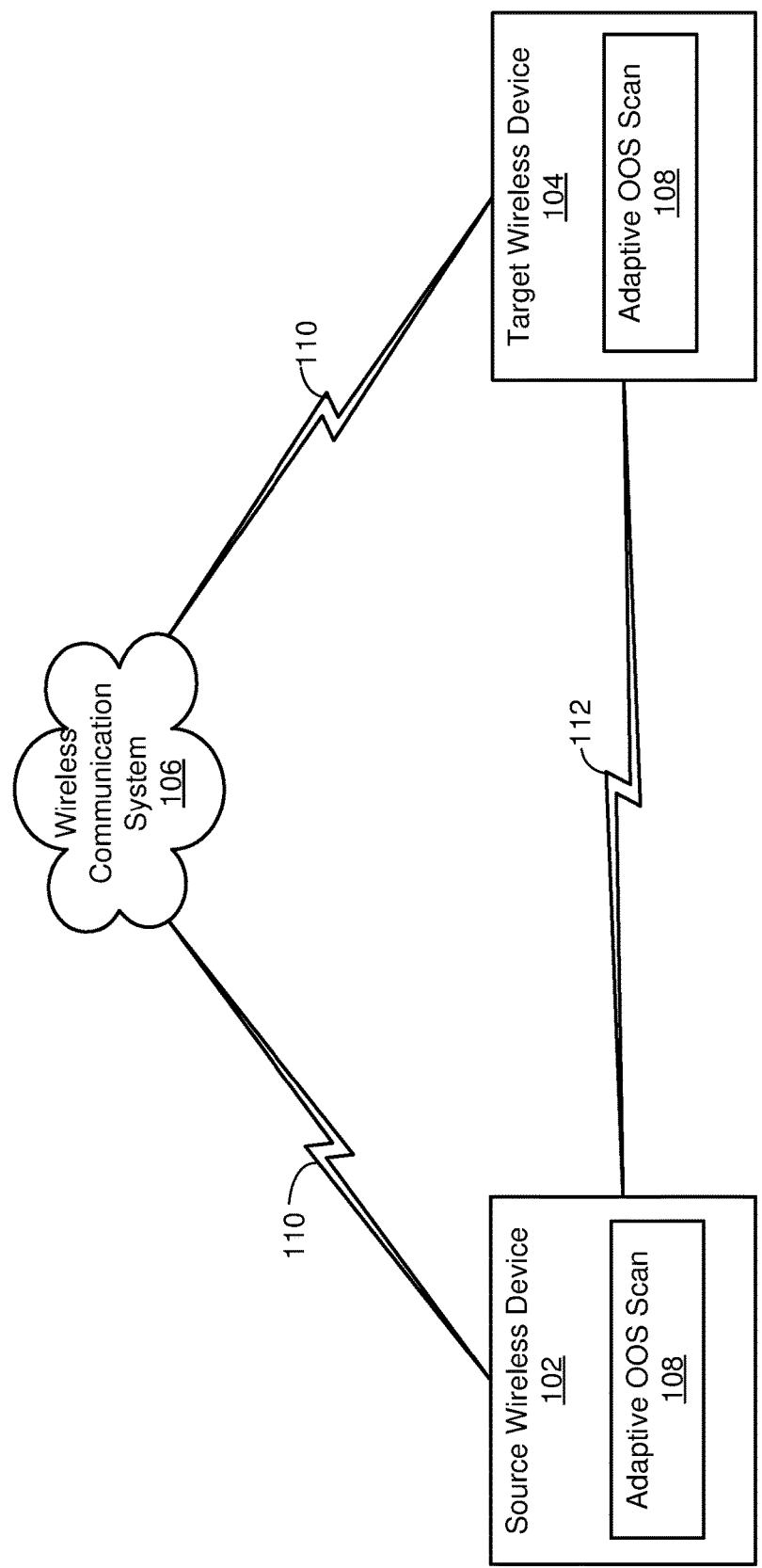
FIG. 1 is a block diagram illustrating one configuration of a source wireless device and target wireless device performing a method for adaptive out of service (OOS) scan for modem power optimization in a wireless communication system.

FIG. 1 is a block diagram illustrating one configuration of a source wireless device 102 and target wireless device 104 performing a method for adaptive out of service (OOS) scan 108 for modem power optimization in a wireless communication system 106.

The source wireless device 102 can establish a direct communication connection with the target wireless device 104 via communication link 112 and then request wireless communication system information from the target wireless device 104. The source wireless device 102 can then activate the adaptive OOS scan 108 on the target wireless device 104 if the source wireless device 102 and target wireless device 104 are connected to the same wireless communication system 106 and using the same radio access technology (RAT) based on the wireless communication system information. The source wireless device 102 can instruct the adaptive OOS scan 108 on the target wireless device 104 to pause the standard OOS scan when both the source wireless device 102 and target wireless device 104 are out of service of the wireless communication system 106. The source wireless device 102 instructs the adaptive OOS scan 108 on the target wireless device 104 to resume the standard OOS scan after the source wireless device 102 has performed the standard OOS scan and finds an acceptable communication connection in order to establish a communication connection to the wireless communication system 106 using the radio access technology.

The source wireless device 102 and target wireless device 104 may be configured to communicate using one or more communication technologies. These communication technologies may include wired communication technologies and wireless communication technologies (sometimes referred to as radio access technology "RAT").

Examples of wired communication technologies include Ethernet and universal serial bus (USB) standards. Other examples of wired communication include telephone networks, cable television, internet access, and fiber-optic communication.

Wireless communication includes the transfer of information between two or more wireless devices that are not connected by an electrical or optical conductor. For example, wireless communication may be implemented through the exchange of electromagnetic waves (e.g., radio waves) or magnetic fields.

Examples of wireless communication technologies include Third Generation Partnership Project (3GPP) Long Term Evolution (LTE) standards, Institute of Electrical and Electronics Engineers (IEEE) 802.11a, 802.11b, 802.11g, 802.11n and/or 802.11ac (e.g., Wireless Fidelity or "Wi-Fi") standards, Bluetooth standards, IEEE 802.16 (e.g., Worldwide Interoperability for Microwave Access or "WiMAX") standards, Global System for Mobile Communications (GSM) networks, code division multiple access (CDMA) networks Code Division Multiplier Access (CDMA) 2000 1× (referred to herein as "1×", may also be referred to as IS-2000 or 1×RTT) standards, Evolution-Data Optimized (EVDO) standards, Interim Standard 95 (IS-95), High Data Rate (HDR), High Rate Packet Data (HRPD), evolved High Rate Packet Data (eHRPD), cellular based, WWAN may also include Wireless Metropolitan Area Networking (WMAN) standards and High-Speed Downlink Packet Access (HSDPA) standards, wireless local area networks (WLANs), wireless personal area networks (WPANs), IEEE 802.15.4, Bluetooth mesh networks, Near field communication (NFC), Wi-Fi, Bluetooth, Bluetooth Low Energy (BLE), ZigBee, radio standards and others.

Communications in a wireless communication system 106 (e.g., a multiple-access system) may be achieved through transmissions over a communication link (e.g., communication link 110). Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receiver antennas for data transmission. SISO and MISO systems are particular instances of a MIMO system. The MIMO system can provide improved performance (e.g., higher throughput, greater capacity or improved reliability) if the additional dimensionalities created by the multiple transmit and receiver antennas are utilized. The wireless communication system 106 is widely deployed to provide several types of communications including audio, data, video, voice, packet, signals, and similar communication types.

Figure 2:
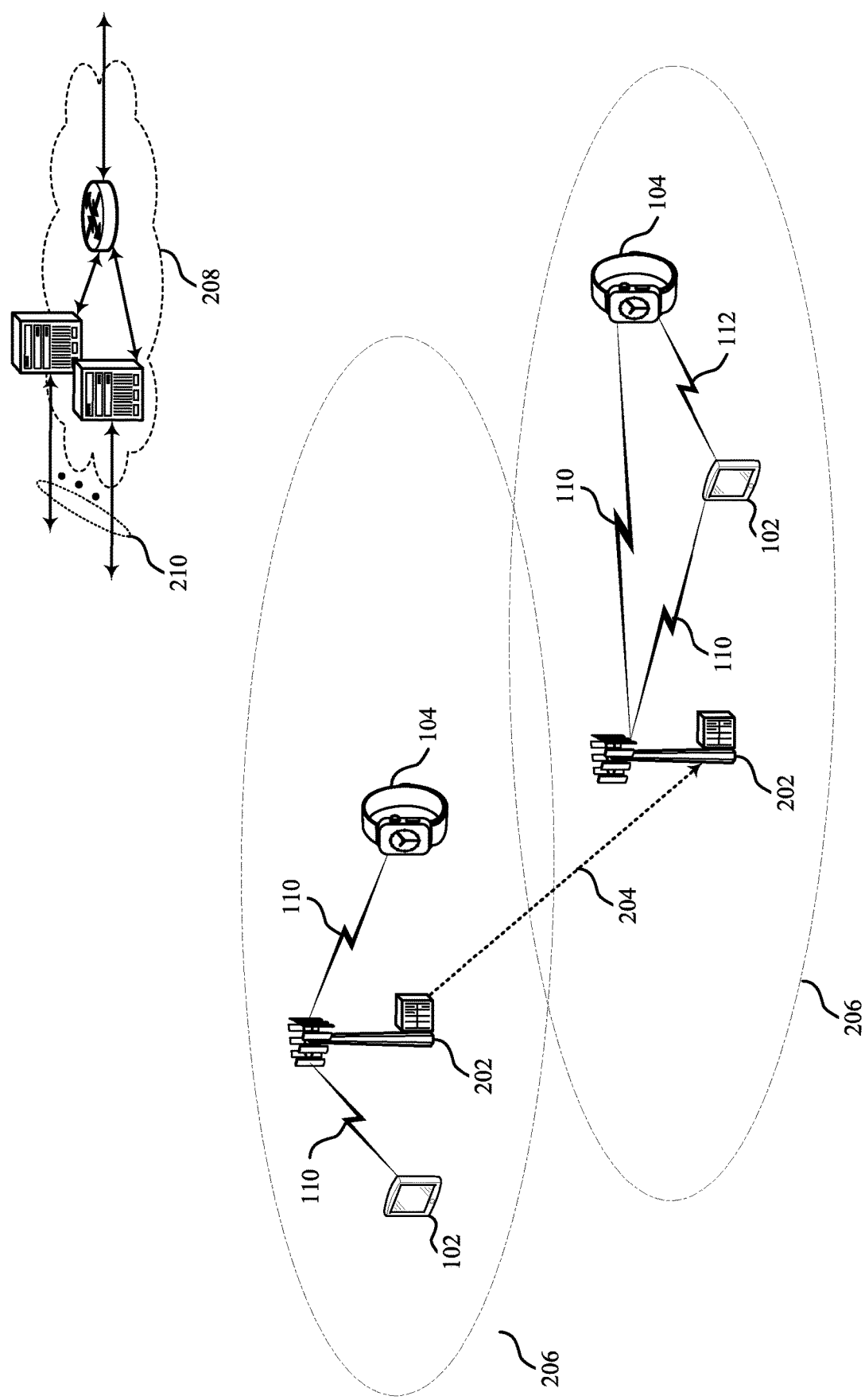
FIG. 2 is a block diagram illustrating one configuration of a wireless communication system including a source wireless device and target wireless device.

In one implementation as illustrated in FIG. 2, the wireless communication system 106 can be implemented as a cellular based wireless communication system 106 in any of the example wireless technologies previously discussed. The wireless communication system 106 implemented in FIG. 2 includes base stations 202, backhaul link 204, geographic coverage area 206, core network 208, and backhaul links 210. The main components of the wireless communication system 106 can include subcomponents and additional main components shown in FIG. 2 depending on the wireless communication system 106 implementation.

The base stations 202 wirelessly communicate with source wireless devices 102 (e.g., smartphones) and target wireless devices 104 (e.g., smartwatches) over communication links 110. Each base station 202 may be associated with a particular geographic coverage area 206 in which communications with the source wireless device 102 and target wireless device 104 for that geographic coverage area 206 is supported. The geographic coverage area 206 for a base station 202 may be divided into sectors making up only a portion of the geographic area 206. Each sector may be associated with a cell. Different geographic coverage areas 206 associated with different technologies may overlap and overlapping geographic coverage areas 110 associated with different technologies may be supported by the same base station 202 or by different base stations 202.

The term "cell" refers to a logical communication entity used for communication with a base station 202 (e.g., over a carrier) and may be associated with an identifier for distinguishing neighboring cells operating via the same or different carrier. In some examples, a carrier may support multiple cells and different cells may be configured according to different protocol types. In some cases, the term "cell" may refer to a portion of geographic coverage area 110 (e.g., a sector) over which the logical entity operates.

In one example, the source wireless device 102 and target wireless device 104 are physically being carried by a user of the two wireless devices outside the geographic coverage area 206. Assuming there is no coverage outside the geographic coverage area 206, then the source wireless device 102 and target wireless device 104 will go into an out of service (OOS) state. An OOS state typically refers to situations when the source wireless device 102 and/or target wireless device 104 are unable to make a communication connection to the wireless communication system 106.

For example, the OOS state can occur for many reasons including insufficient received signal strength to the base station 202. Base stations 202 may communicate with the core network 208 and with one another. For example, base stations 202 may interface with the core network 208 through backhaul links 210 (e.g., via an Si or other interface). The core network 208 may provide user authentication, access authorization, tracking, Internet Protocol (IP) connectivity, and other access, routing, or mobility functions. The core network 208 can be configured in different ways and include multiple gateways, access to network operators giving various services such as Internet services, access to land based phone services, and related services.

The source wireless device 102 and target wireless device 104 may also be separately referred to as a wireless device, a mobile device, mobile station, subscriber station, client, client station, user equipment (UE), remote station, access terminal, mobile terminal, terminal, user terminal, subscriber unit, etc. Examples of the source wireless device 102 and target wireless device 104 include laptop computers, desktop computers, cellular phones, mobile phone, smartphones, e-readers, tablet devices, gaming systems, keyboards, keypads, computer mice, remote controllers, handsets, headsets, headphones, Internet of Things (TOT) devices, wearables, smart home devices, smart appliances, automobile hands-free audio system, servers, smartwatches, unmanned aerial vehicle (uav), and similar devices.

In an implementation, the source wireless device 102 and target wireless device 104 may be configured to communicate using Bluetooth protocols. The source wireless device 102 and target wireless device 104 configured to communicate using Bluetooth communications can establish communication links (e.g., communication link 112) with one or more wireless devices that have Bluetooth transceivers. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel).

Communications in a Bluetooth network may be achieved based on a master polled system. The master polled system may utilize time-division duplexing (TDD) in which the source wireless device 102 may send a packet to the target wireless device 104. For example, the source wireless device 102 may send a packet to the target wireless device 104 during pairing or during a connection request. In one implementation, the source wireless device 102 may be a master device and the target wireless device 104 may be a slave device. In a master polled system, the source wireless device 102 sending the packet gives the slave target wireless device 104 the ability to transmit back. The roles of the source wireless device 102 and target wireless device 104 may be switched where the source wireless device 102 becomes the slave device and the target wireless device 104 becomes the master device.

The Bluetooth wireless communication standard is typically employed for exchanging communications between fixed or mobile Bluetooth-enabled devices over short distances. In some configurations, the systems and methods disclosed herein may be applied to Bluetooth Low Energy (BLE) devices. LE refers to the "Low Energy" extension of the Bluetooth standard. The BLE extension is focused on energy-constrained applications such as battery-operated devices, sensor applications, etc. The BLE extension may also be referred to as Bluetooth Smart.

The following description uses terminology associated with the Bluetooth and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

The source wireless device 102 and target wireless device 104 may include the adaptive out of service (OOS) scan 108. The source wireless device 102 and target wireless device 104 will also include additional software and hardware as further detailed in the wireless device in FIG. 5 which may also include one or more transmitters and receivers, processor(s), memory, antennas, digital signal processor(s), communications interface, user interface, operating systems, storage devices, and related subsystems required to operate and implement the methods described in the source wireless device 102 and target wireless device 104.

Figure 3:
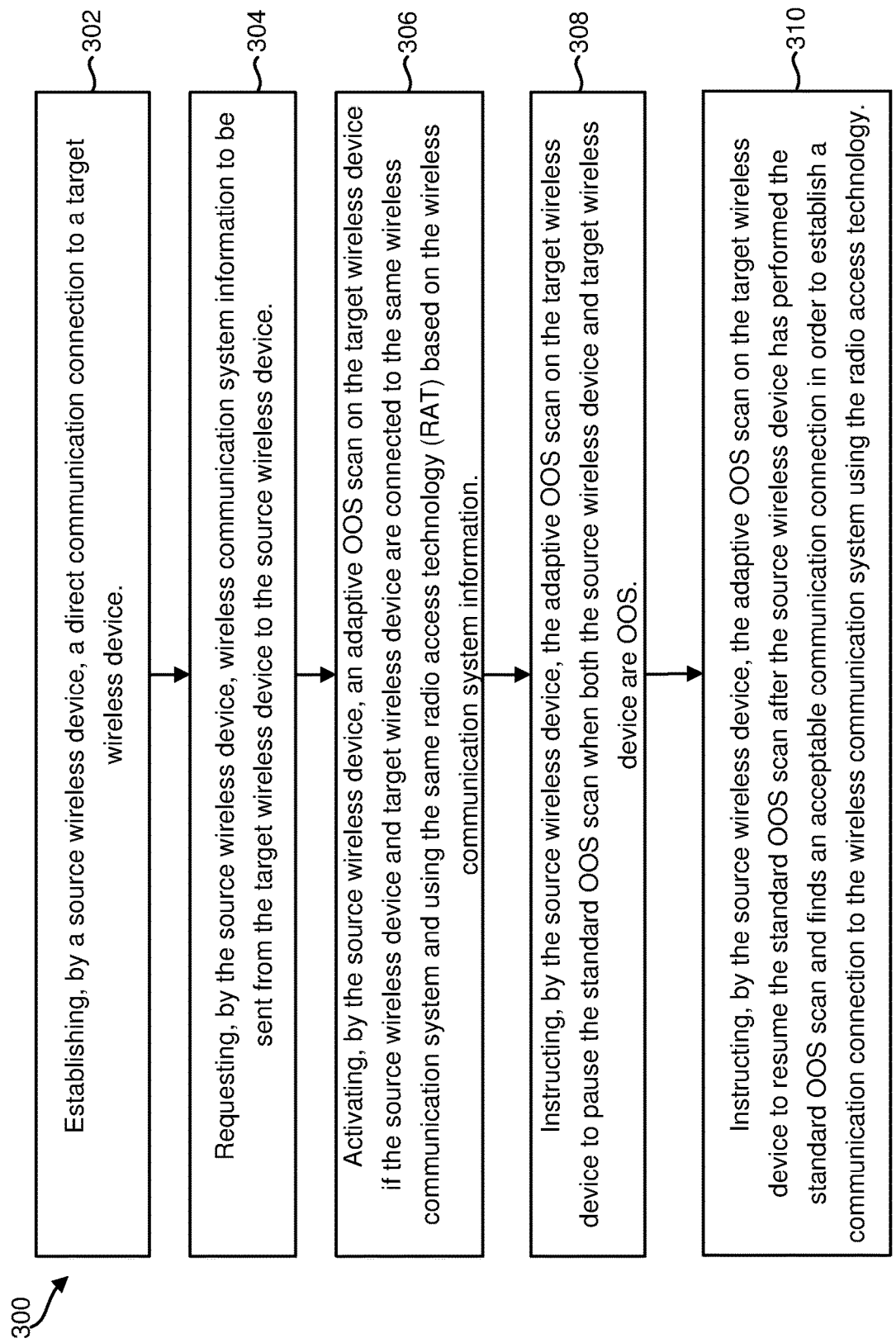
FIG. 3 is a flow diagram illustrating a method for adaptive out of service (OOS) scan for modem power optimization in a wireless communication system.
Figure 4:
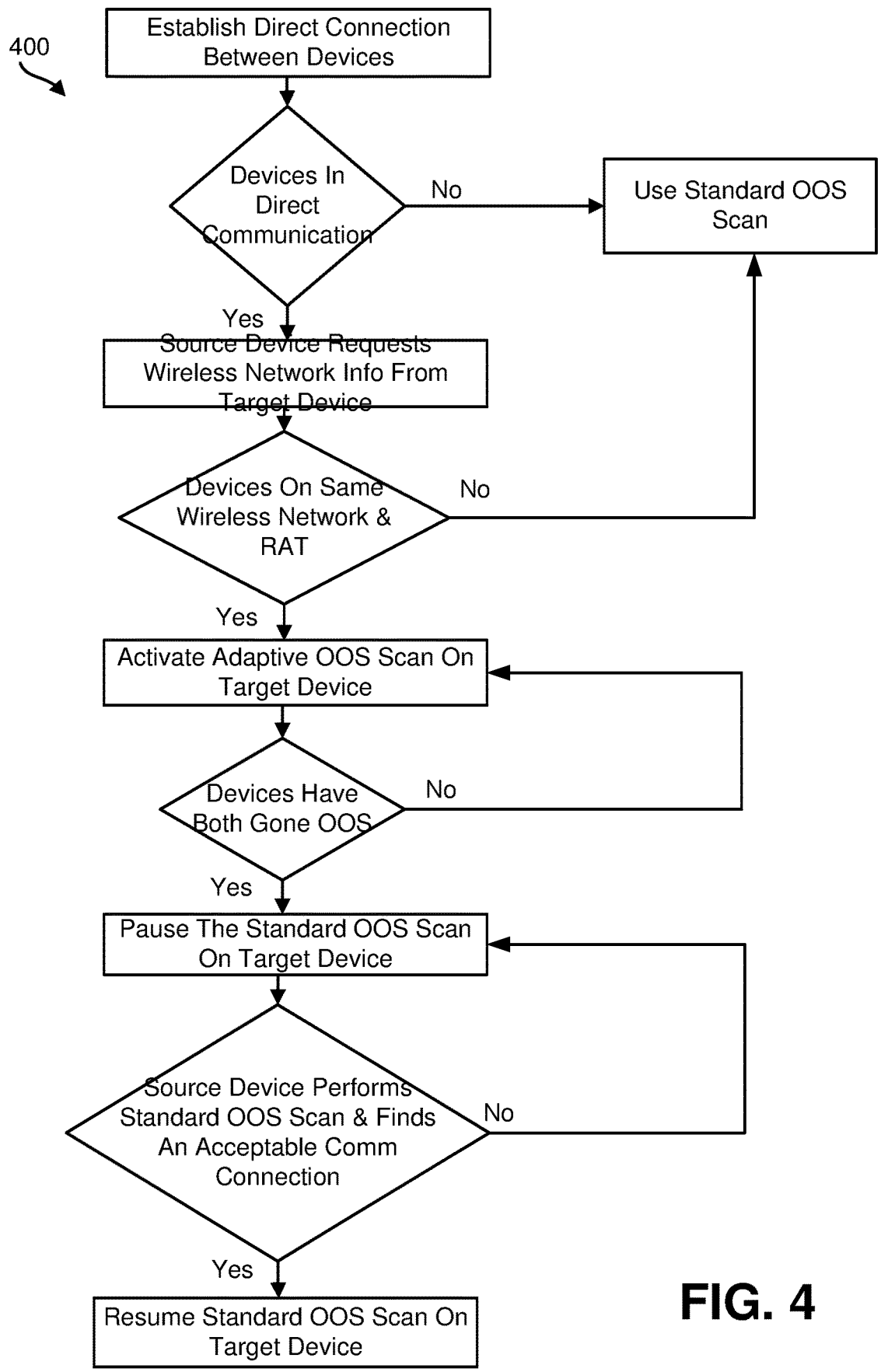
FIG. 4 is a flow diagram illustrating another method for adaptive out of service (OOS) scan for modem power optimization in a wireless communication system.

The adaptive out of service (OOS) scan 108 is the main module that handles a portion of the implementation of the method detailed in flowcharts in FIGS. 3 and 4. The adaptive (OOS) scan 108 can be implemented on a single wireless device and/or multiple devices such as source wireless device 102 and target wireless device 104. When the adaptive OOS scan 108 is implemented on multiple devices, each version of the adaptive OOS scan 108 can work in conjunction with the others to carry out the adaptive OOS scan 108 functions. For example, the adaptive OOS scan 108 resides on the source wireless device 102 and the target wireless device 104 which work in conjunction to carry out the method detailed in FIGS. 3 and 4. The adaptive OOS scan 108 can be implemented in the form of software and/or hardware. The software can include single, multiple, or a combination of applications, plugins, drivers, middleware, or any other form of software. Depending on the implementation, the adaptive OOS scan 108 can include an implementation that requires multiple applications.

In one implementation, the adaptive OOS scan 108 is an application that runs on the source wireless device 102 that allows the source wireless device 102 to activate and communicate with the adaptive OOS scan 108 that runs on the target wireless device 104. The two instances of the adaptive OOS scan 108 on the source wireless device 102 and target wireless device 104 work in conjunction to ensure the adaptive OOS scan 108 is performed.

In another implementation, the source wireless device 102 can activate and communicate with the adaptive OOS scan 108 on the target wireless device 104 with a combination of software and/or hardware. Additional implementations and specific uses of the adaptive OOS scan 108 are detailed in flow diagrams in FIGS. 3 and 4.

The standard out of service (OOS) scan is the default scan that is generally performed on the source wireless device 102 and/or target wireless device 104 when the wireless device are out of service of the wireless communication system 106. The source wireless device 102 and/or target wireless device 104 will be out of service when they lose connection to the wireless communication system 106 and/or are not able to reestablish communication connection with the wireless communication system 106. The standard OOS scan is performed by the source wireless device 102 and/or target wireless device 104 to find a way to establish a communication connection back to the wireless communication system 106. For example, the source wireless device 102 is a smartphone and the user of the smartphone takes it to a remote location which puts the smartphone in an out of service state. Once the smartphone detects an out of service state, then the smartphone will perform a standard OOS scan to try and find a way to establish a communication connection back to the wireless communication system 106.

The described methods can give the user of multiple wireless devices the ability to save significant battery power on wireless devices that have a much smaller battery reserve such as smartwatches, wearables, and more. This helps to ensure that users of wireless devices can get more daily and functional use out of their wireless devices.

FIG. 3 is a flow diagram illustrating a method for adaptive out of service (OOS) scan for modem power optimization in a wireless communication system. This method 300 may be implemented by a source wireless device 102 that can communicate with the target wireless device 104 over communication link 112 and/or communication links 110. FIG. 4 has been provided as additional reference and simplification of this method 300.

In one implementation as detailed in FIG. 1, the source wireless device 102 can establish a direct communication connection with the target wireless device 104 via communication link 112 and then request wireless communication system information from the target wireless device 104. The source wireless device 102 can then activate the adaptive OOS scan 108 on the target wireless device 104 if the source wireless device 102 and target wireless device 104 are connected to the same wireless communication system 106 and using the same radio access technology (RAT) based on the wireless communication system information. The source wireless device 102 can instruct the adaptive OOS scan 108 on the target wireless device 104 to pause the standard OOS scan when both the source wireless device 102 and target wireless device 104 are out of service of the wireless communication system. The source wireless device 102 instructs the adaptive OOS scan 108 on the target wireless device 104 to resume the standard OOS scan after the source wireless device 102 has performed the standard OOS scan and finds an acceptable communication connection in order to establish a communication connection to the wireless communication system 106 using the radio access technology.

At 302, the source wireless device 102 establishes a direct communication connection to the target wireless device 104 via communication link 112. As discussed above in FIG. 1, the source wireless device 102 can communicate directly with the target wireless device 104 through different communication methods such as Bluetooth, Bluetooth Low Energy, Near field communication (NFC), ZigBee, Wi-Fi, and any other short-range wireless communication technologies.

In one implementation, the source wireless device 102 establishes a direct communication link 112 with the target wireless device 104 via a Bluetooth connection to become paired. Once paired, the source wireless device 102 will be the master device and the target wireless device 104 will be the slave device. The source wireless device 102 and target wireless device 104 can then send and receive communications to each other via the established Bluetooth link.

If the source wireless device 102 and the target wireless device 104 are not in direct communication, then the source wireless device 102 can continue to attempt to make a direct communication connection with the target wireless device 104. In the event that the source wireless device 102 cannot make a direct communication connection with the target wireless device 104, then the source wireless device 102 and the target wireless device 104 will perform the standard OOS scan as further shown in FIG. 4.

If the source wireless device 102 and target wireless device 104 get disconnected anytime during this method 300, then the source wireless device 102 can continue to retry to establish a direct communication connection. The source wireless device 102 can retry to establish this direct communication connection continuously, periodically, or a set number of times. If at any time during this method 300, the source wireless device 102 and target wireless device 104 cannot reestablish a direct communication connection, then the source wireless device 102 and target wireless device 104 can perform the standard OOS scan.

At 304, the source wireless device 102 requests wireless communication system information to be sent from the target wireless device 104 to the source wireless device 102.

The wireless communication system information can be any form of information that indicates information about one or more wireless communication system 106. The wireless communication system information can also contain identification, carrier information, location, metrics, statistics, signal information, and other information about a wireless communication system 106. The wireless communication system information can take the form of text, file, database, data, or any other transferrable medium that can contain information.

For example, the target wireless device 104 sends the source wireless device 102 a file that contains the wireless communication system information. The wireless communication system information contains information that gives the source wireless device 102 the ability to know which the type of wireless communication system, specific carrier, radio access technologies (RATs), and other information about the wireless communication system 106 that the target wireless device 104 is connected to for service. For example, the source wireless device 102 can use the wireless communication system information to know if the two wireless devices are connected to the same or a different wireless communication system 106, carrier information, and the radio access technology the target wireless device 104 is using. For example, the wireless communication system 106 can be a cellular based system controlled by a carrier such as Verizon, Sprint, T-Mobile, AT&T and using CDMA, LTE, etc. as the radio access technology.

At 306, the source wireless device 102 activates an adaptive OOS scan 108 on the target wireless device 104 if the source wireless device 102 and target wireless device 104 are connected to the same wireless communication system 106 and using the same radio access technology (RAT) based on the wireless communication system information.

The source wireless device 102 receives the wireless communication system information from the target wireless 104 and determines if both wireless devices are connected to the same wireless communication system 106 and using the same radio access technology. If the source wireless device 102 and the target wireless device 104 are not on the same wireless communication system 106 and/or using the same radio access technology, then the adaptive OOS scan 108 on the target wireless device 104 will not be activated and both wireless devices will conduct a standard out of service (OOS) scan as further detailed in FIG. 4.

If the source wireless device 102 and target wireless device 104 are on the same wireless communication system 106 and using the same radio access technology, then the source wireless device 102 will activate the adaptive OOS scan 108 on the target wireless device 104.

In one implementation, the adaptive OOS scan 108 is an application that runs on the source wireless device 102 that allows the source wireless device 102 to activate and communicate with the adaptive OOS scan 108 that runs on the target wireless device 104. The two instances of the adaptive OOS scan 108 on the source wireless device 102 and target wireless device 104 work in conjunction to ensure the adaptive OOS scan 108 is performed on the target wireless device 104.

In another implementation, the source wireless device 102 can activate and communication with the adaptive OOS scan 108 on the target wireless device 104 with a combination of software and/or hardware. In another implementation, the target wireless device 104 can alternatively directly active and perform the adaptive OOS scan 108 without direct instruction from the source wireless device 102.

At 308, the source wireless device 102 instructs the adaptive OOS scan 108 on the target wireless device 104 to pause the standard OOS scan when both the source wireless device 102 and target wireless device 104 are out of service of the wireless communication system 106.

The source wireless device 102 is able to detect, monitor, and determine that the source wireless device 102 and the target wireless device 104 are out of service of the wireless communication system 106. For example, the source wireless device 102 can make this detection through the use of the adaptive OOS scan 108 that runs on the source wireless device 102 and/or target wireless device 104.

In another example, the source wireless device 102 can make the detection by direct communication with the target wireless device 104 through software and/or hardware. For example, in a cellular network, the source wireless device 102 can detect that it is out of service based on the lack of received signal strength coming from within the wireless communication system 106. Alternatively, the source wireless device 102 can assume that target wireless device 104 is out of service when the source wireless device 102 is out of service if they are in the same proximate physical location.

If the source wireless device 102 and target wireless device 104 are not out of service, then the source wireless device 102 can continue to keep the adaptive OOS scan 108 on the target wireless device 104 active. The source wireless device 102 can continue to monitor for when the source wireless device 102 and target wireless device 104 both are OOS.

At 310, the source wireless device 102 instructs the adaptive OOS scan 108 on the target wireless device 104 to resume the standard OOS scan after the source wireless device 102 has performed the standard OOS scan and finds an acceptable communication connection in order to establish a communication connection to the wireless communication system 106 using the radio access technology.

In one implementation, the source wireless device 102 performs the standard OOS scan by scanning a set of frequencies within the wireless communication system 106 to find an acceptable communication connection to the wireless communication system 106 using the RAT. An acceptable communication connection can be a communication connection based on based on different sets of criteria including received signal strength, base station lists, neighbor lists, and other communication metrics.

For example, the source wireless device 102 scans a set of frequencies and determines that the received signal strength associated with a certain cell is acceptable to enable the source wireless device 102 to make a communication connection to a base station 202 within the wireless communication system 106.

After the source wireless device 102 has found an acceptable communication connection, then the source wireless device 102 will instruct the target wireless device 104 to resume the standard OOS scan. In one implementation, the adaptive OOS scan 108 is an application running on the source wireless device 102 and instructs the adaptive OOS scan 108 on the target wireless device 104 to resume the standard OOS scan.

If the source wireless device 102 does not find an acceptable communication connection, then the source wireless device 102 will continue to scan for an acceptable communication connection and instruct the target wireless device 104 to keep the standard OOS scan paused until the source wireless device 102 finds an acceptable communication connection.

FIG. 4 is a flow diagram illustrating another method for adaptive out of service (00S) scan for modem power optimization in a wireless communication system 106. This method 400 is similar to method 300 except that it is a minimized representation of the method detailed in FIG. 3 and is provided as supplemental reference.

Figure 5:
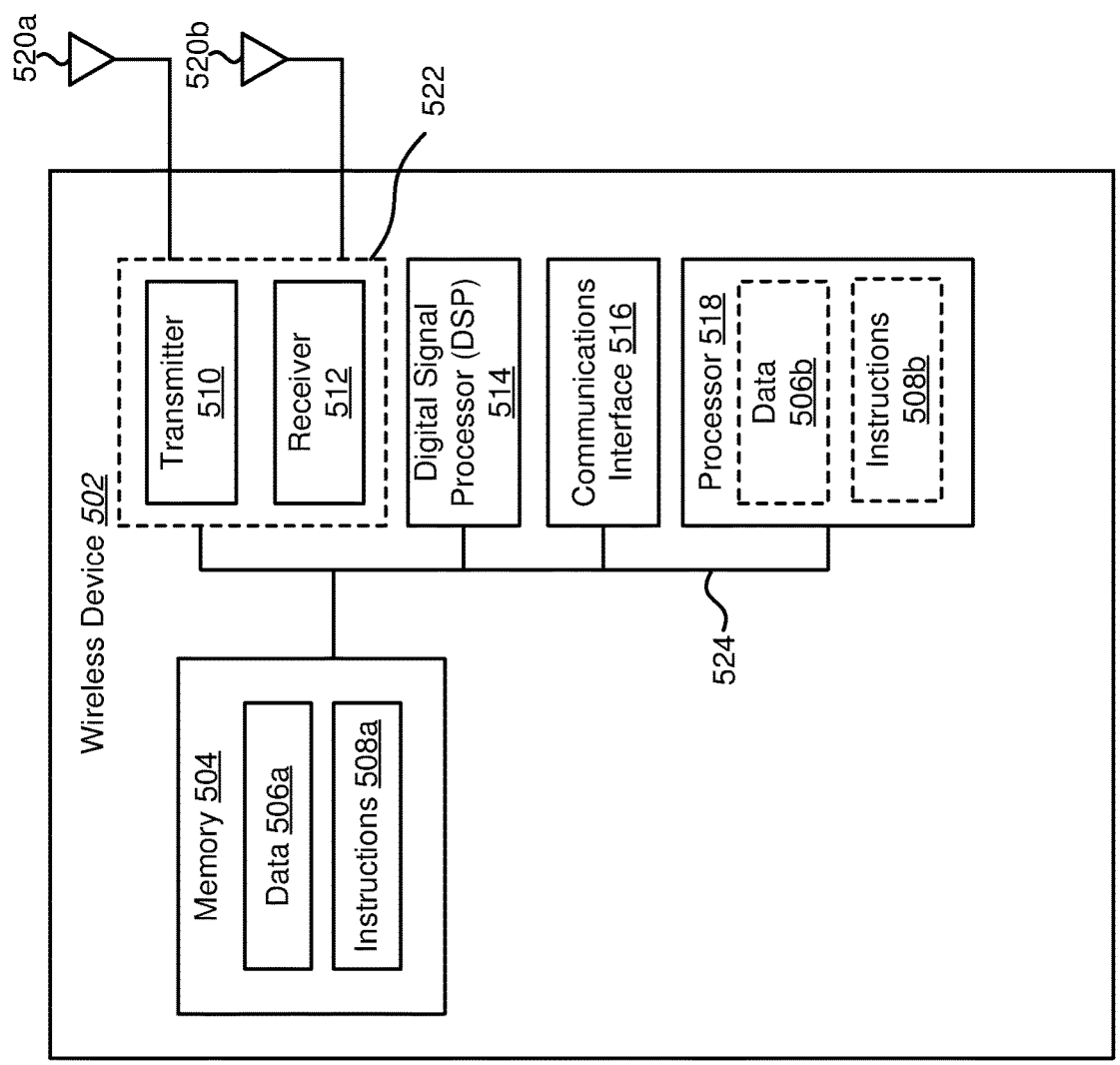
FIG. 5 illustrates certain components that may be included within a wireless device.

FIG. 5 illustrates certain components that may be included within a wireless device 502. The wireless device 502 may be a wireless communication device, an access terminal, a mobile station, a user equipment (UE), a laptop computer, a desktop computer, a tablet computer, computer, mobile phone, smartphone, a wireless headset, server, and the like. For example, the wireless device 502 may be implemented in accordance with the source wireless device 102 and target wireless device 104.

The wireless device 502 includes a processor 518. The processor 518 may be a general purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 518 may be referred to as a central processing unit (CPU). Although just a single processor 518 is shown, a combination of processors (e.g., an ARM and DSP) could be used.

The wireless device 502 also includes memory 504 in electronic communication with the processor (i.e., the processor can read information from and/or write information to the memory). The memory 504 may be any electronic component capable of storing electronic information. The memory 504 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 506*a* and instructions 508*a* may be stored in the memory 504. The instructions may include one or more programs, routines, sub-routines, functions, procedures, code, etc. The instructions may include a single computer-readable statement or many computer-readable statements. The instructions 508*a* may be executable by the processor 518 to implement the methods disclosed herein. Executing the instructions 508*a* may involve the use of the data 506*a* that is stored in the memory 504. When the processor 518 executes the instructions 508*a*, various portions of the instructions 508*b* may be loaded onto the processor 518, and various pieces of data 506*b* may be loaded onto the processor 518.

The wireless device 502 may also include a transmitter 510 and a receiver 512 to allow for transmission and reception of signals to and from the wireless device 502 via one or more antennas 520*a*-520*b*. The transmitter 510 and receiver 512 may be collectively referred to as a transceiver 522. The wireless device 502 may also include (not shown) multiple transmitters, multiple receivers, multiple transceivers, communications controllers, modems, and the like that would further enable the wireless device 502 to transmit and receive wireless communications. The types of wireless communications are listed in the discussion of FIG. 1 and wireless communication system 106. Examples include Wi-Fi, cellular, LTE, CDMA, personal area, Bluetooth, Bluetooth Low Energy, Near Field Communication (NFC), ZigBee, and similar wireless communications.

The antennas 520*a*-520*b* may include one or more transmitter antennas and one or more receiver antennas. The particular antenna configurations for the wireless device 502 can be based on the number of transmitters and receivers included in the wireless device 502 along with the particular communication network and other factors. In one implementation, there may be multiple transmitter antennas and multiple receiver antennas on a single wireless device.

The wireless device 502 may include a digital signal processor (DSP) 514. The wireless device 502 may also include a communications interface 516. The communications interface 516 may allow a user to interact with the wireless device 502.

The various components of the wireless device 502 may be coupled together by one or more buses, which may include a power bus, a control signal bus, a status signal bus, a data bus, etc. For the sake of clarity, the various buses are illustrated in FIG. 5 as a bus system 524.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for adaptive out of service (OOS) scan for modem power optimization in a wireless communication system, comprising:
 establishing, by a source wireless device, a direct communication connection to a target wireless device;

requesting, by the source wireless device, wireless communication system information to be sent from the target wireless device to the source wireless device;

activating, by the source wireless device, an adaptive OOS scan on the target wireless device if the source wireless device determines that the source wireless device and target wireless device are connected to the same wireless communication system and using the same radio access technology (RAT) based on the wireless communication system information;

instructing, by the source wireless device, the adaptive OOS scan on the target wireless device to pause a standard OOS scan when both the source wireless device and target wireless device are taken outside the reach of the wireless communication system and go into an out of service state; and instructing, by the source wireless device, the adaptive OOS scan on the target wireless device to resume the standard OOS scan after the source wireless device has performed the standard OOS scan by scanning a set of frequencies within the wireless communication system and finds an acceptable communication connection in order to establish a communication connection to the wireless communication system using the radio access technology.

2. The method of claim 1, wherein the direct communication connection between the source wireless device and target wireless device is a Bluetooth connection, Bluetooth Low Energy connection, Near field communication (NFC), or WiFi connection.

3. The method of claim 1, wherein the acceptable communication connection has a sufficient signal strength to allow the source wireless device to establish a communication connection to the wireless communication system using the radio access technology.

4. The method of claim 1, wherein the target wireless device will initiate the standard OOS if the source wireless device and target wireless device lose direct communication connection to each other.

5. The method of claim 1, further including the source wireless device sending the target wireless device information on the acceptable communication connection.

6. The method of claim 1, wherein the target wireless device is a smartwatch.

7. The method of claim 1, wherein the radio access technology is cellular based.

8. The method of claim 1, wherein the source wireless device finds an acceptable communication connection by determining that a received signal strength associated with a certain cell is acceptable to enable the source wireless device to make a communication connection to a base station within the wireless communication system.

9. The method of claim 1, wherein the source wireless device does not find an acceptable communication connection, then the source wireless device will continue to scan for an acceptable communication connection and instruct the target wireless device to keep the standard OOS scan paused until the source wireless device finds an acceptable communication connection.

10. The method of claim 1, wherein the wireless communication system is a cellular network.

11. A source wireless device for adaptive out of service (OOS) scan for modem power optimization in a wireless communication system, comprising:

a processor; and a memory communicatively coupled with the processor and storing computer-readable code that, when executed by the processor, causes the source wireless device to:

establishing a direct communication connection to a target wireless device;

requesting wireless communication system information to be sent from the target wireless device to the source wireless device;

activating an adaptive OOS scan on the target wireless device if the source wireless device determines that the source wireless device and target wireless device are connected to the same wireless communication system and using the same radio access technology (RAT) based on the wireless communication system information;

instructing the adaptive OOS scan on the target wireless device to pause a standard OOS scan when both the source wireless device and target wireless device are taken outside the reach of the wireless communication system and go into an out of service state; and instructing the adaptive OOS scan on the target wireless device to resume the standard OOS scan after the source wireless device has performed the standard OOS scan by scanning a set of frequencies within the wireless communication system and finds an acceptable communication connection in order to establish a communication connection to the wireless communication system using the radio access technology.

12. The source wireless device of claim 11, wherein the direct communication connection between the source wireless device and target wireless device is a Bluetooth connection, Bluetooth Low Energy connection, Near field communication (NFC), or WiFi connection.

13. The source wireless device of claim 11, wherein the acceptable communication connection has a sufficient signal strength to allow the source wireless device to establish a communication connection to the wireless communication system using the radio access technology.

14. The source wireless device of claim 11, wherein the target wireless device will initiate the standard OOS if the source wireless device and target wireless device lose direct communication connection to each other.

15. The source wireless device of claim 11, further including the source wireless device sending the target wireless device information on the acceptable communication connection.

16. The source wireless device of claim 11, wherein the target wireless device is a smartwatch.

17. The source wireless device of claim 11, wherein the radio access technology is cellular based.

18. A source wireless device for adaptive out of service (OOS) scan for modem power optimization in a wireless communication system, comprising:

means for establishing a direct communication connection to a target wireless device;

means for requesting wireless communication system information to be sent from the target wireless device to the source wireless device;

means for activating an adaptive OOS scan on the target wireless device if the source wireless device determines that the source wireless device and target wireless device are connected to the same wireless communication system and using the same radio access technology (RAT) based on the wireless communication system information;

means for instructing the adaptive OOS scan on the target wireless device to pause a standard OOS scan when both the source wireless device and target wireless device are taken outside the reach of the wireless communication system and go into an out of service state; and means for instructing the adaptive OOS scan on the target wireless device to resume the standard OOS scan after the source wireless device has performed the standard OOS scan by scanning a set of frequencies within the wireless communication system and finds an acceptable communication connection in order to establish a communication connection to the wireless communication system using the radio access technology.

19. The source wireless device of claim 18, wherein the direct communication connection between the source wireless device and target wireless device is a Bluetooth connection, Bluetooth Low Energy connection, Near field communication (NFC), or WiFi connection.

20. The source wireless device of claim 18, wherein the acceptable communication connection has a sufficient signal strength to allow the source wireless device to establish a communication connection to the wireless communication system using the radio access technology.

21. The source wireless device of claim 18, wherein the target wireless device will initiate the standard OOS if the source wireless device and target wireless device lose direct communication connection to each other.

22. The source wireless device of claim 18, further including means for sending, by the source wireless device, the target wireless device information on the acceptable communication connection.

23. The source wireless device of claim 18, wherein the target wireless device is a smartwatch.

24. The source wireless device of claim 18, wherein the radio access technology is cellular based.

25. A non-transitory tangible computer readable medium storing one or more instructions, comprising:

one or more instructions that, when executed by one or more processors of a source wireless device, cause the one or more processors to:

establish, by the source wireless device, a direct communication connection to a target wireless device;

request, by the source wireless device, wireless communication system information to be sent from the target wireless device to the source wireless device;

activate, by the source wireless device, an adaptive OOS scan on the target wireless device if the source wireless device determines that the source wireless device and target wireless device are connected to the same wireless communication system and using the same radio access technology (RAT) based on the wireless communication system information;

instruct, by the source wireless device, the adaptive OOS scan on the target wireless device to pause a standard OOS scan when both the source wireless device and target wireless device are taken outside the reach of the wireless communication system and go into an out of service state; and instruct, by the source wireless device, the adaptive OOS scan on the target wireless device to resume the standard OOS scan after the source wireless device has performed the standard OOS scan by scanning a set of frequencies within the wireless communication system and finds an acceptable communication connection in order to establish a communication connection to the wireless communication system using the radio access technology.

26. The computer readable medium of claim 25, wherein the direct communication connection between the source wireless device and target wireless device is a Bluetooth connection, Bluetooth Low Energy connection, Near field communication (NFC), or WiFi connection.

27. The computer readable medium of claim 25, wherein the acceptable communication connection has a sufficient signal strength to allow the source wireless device to establish a communication connection to the wireless communication system using the radio access technology.

28. The computer readable medium of claim 25, wherein the target wireless device will initiate the standard OOS if the source wireless device and target wireless device lose direct communication connection to each other.

29. The computer readable medium of claim 25, further including the source wireless device sending the target wireless device information on the acceptable communication connection.

30. The computer readable medium of claim 25, wherein the target wireless device is a smartwatch.

31. The computer readable medium of claim 25, wherein the radio access technology is cellular based.

* * * * *